(12) United States Patent
Zarlengo

(10) Patent No.: US 6,435,080 B1
(45) Date of Patent: Aug. 20, 2002

(54) SYSTEM FOR SECURELY AND REMOVABLY ATTACHING A FOOD PROCESSING ADAPTER TO A FOOD PROCESSING AND JUICING UNIT

(75) Inventor: Vincent Zarlengo, Denver, CO (US)

(73) Assignees: Thane International, Inc., La Quinta, CA (US); WHJ, Inc., Las Vegas, NV (US)

(*) Notice: Subject to any disclaimer, the term of this patent is extended or adjusted under 35 U.S.C. 154(b) by 0 days.

(21) Appl. No.: 09/996,851

(22) Filed: Nov. 20, 2001

Related U.S. Application Data

(63) Continuation-in-part of application No. 09/833,872, filed on Apr. 12, 2001.
(60) Provisional application No. 60/196,380, filed on Apr. 12, 2000, provisional application No. 60/274,184, filed on Mar. 9, 2001, and provisional application No. 60/274,183, filed on Mar. 9, 2001.

(51) Int. Cl.[7] .............................. A23L 1/00; A47J 43/14; A47J 19/02; A23N 1/00; B30B 9/02
(52) U.S. Cl. .............................. 99/510; 99/495; 99/509; 83/858; 83/932; 100/98 R; 100/103; 100/125; 100/257; 100/288; 100/902
(58) Field of Search .......................... 99/495, 501–511, 99/537, 538, 543, 545, 584; 83/858, 932, 435.18; 100/98 R, 103, 125, 257, 288, 902; 426/481, 489, 499, 656, 270, 636; D7/665, 666; 30/303, 302

(56) References Cited

U.S. PATENT DOCUMENTS

| | | | | |
|---|---|---|---|---|
| 752,884 A | * | 2/1904 | Carmichael | 100/288 X |
| 783,300 A | * | 2/1905 | McGrath | 99/495 X |
| 789,623 A | * | 5/1905 | McGrath | 100/288 X |
| 1,038,543 A | * | 9/1912 | Eames | 99/509 X |
| 1,813,954 A | * | 7/1931 | Rice | 100/125 X |
| 1,867,657 A | * | 7/1932 | Dellinger | 83/932 X |
| 1,947,153 A | * | 2/1934 | Dellinger | 99/495 X |
| 2,245,978 A | * | 6/1941 | Hyland | 99/510 X |
| 2,507,963 A | | 5/1950 | Davitcho | |
| 2,509,190 A | * | 5/1950 | Langley | 99/545 |
| 2,693,210 A | | 11/1954 | Gustafson | |
| 2,703,522 A | * | 3/1955 | Smith | 100/98 R |
| 4,345,519 A | * | 8/1982 | Sabino | 99/510 X |
| 5,188,024 A | * | 2/1993 | Li | 100/125 X |
| 5,245,902 A | * | 9/1993 | Pereira | 99/510 X |
| 5,520,105 A | | 5/1996 | Healy | |

* cited by examiner

*Primary Examiner*—Timothy F. Simone
(74) *Attorney, Agent, or Firm*—Kelly Bauersfeld Lowry & Kelley, LLP

(57) ABSTRACT

A system for attaching a food processing adapter to a food processing unit includes an upper processing adapter attached to a pressure assembly of the unit, and a lower processing adapter attached to a holder at a base of the unit. The holder includes a first slot extending horizontally into a top portion of the holder, and a second slot opposite the first slot and extending vertically into the holder. A first tab extends horizontally from the lower processing adapter and is configured to be inserted into the first slot. A second tab extends vertically from the lower processing adapter so as to be inserted into the second slot. A locking mechanism is configured to releaseably lock the second tab in place to prevent movement of the lower processing adapter during operation of the food processing unit.

25 Claims, 8 Drawing Sheets

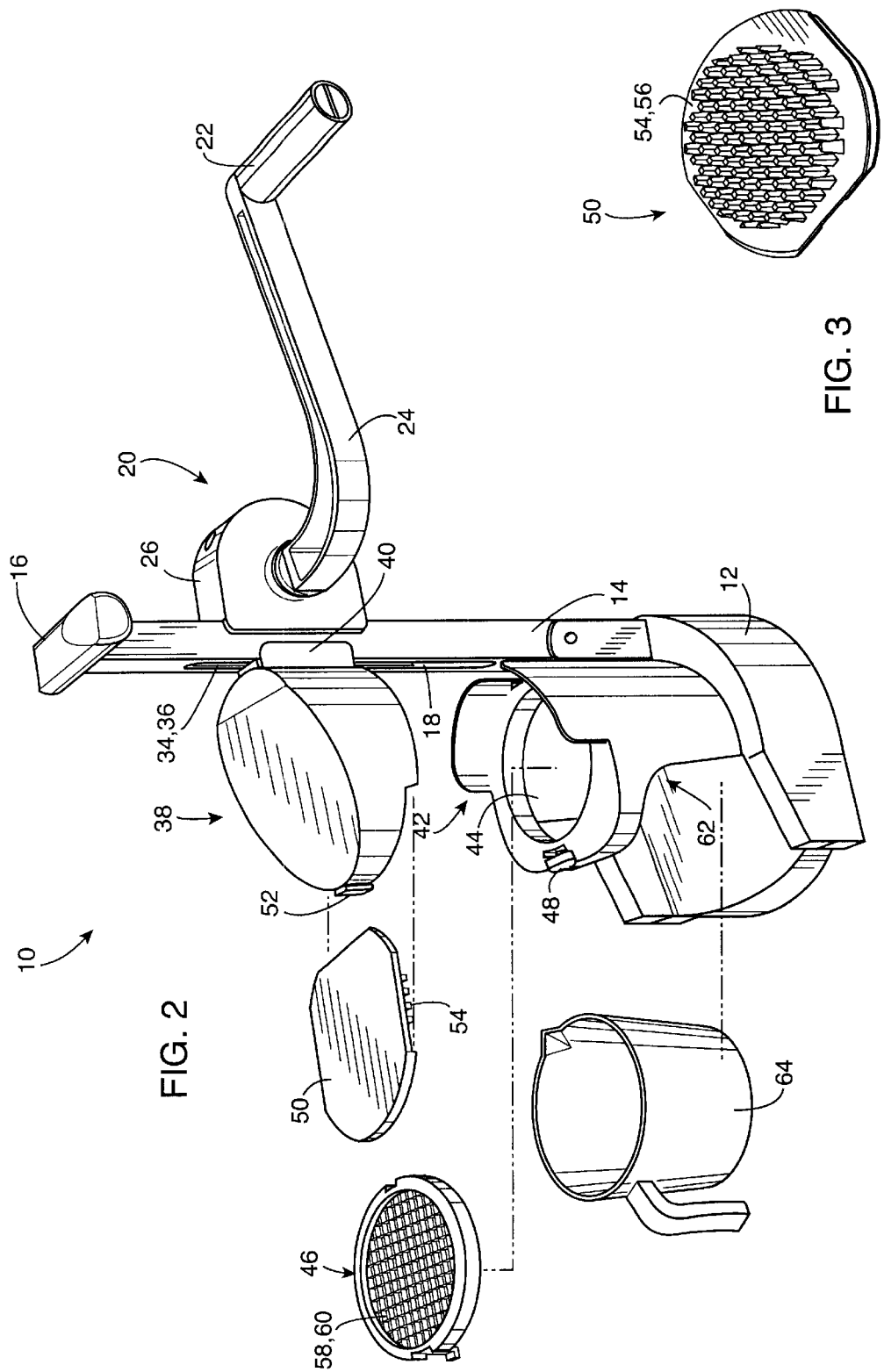

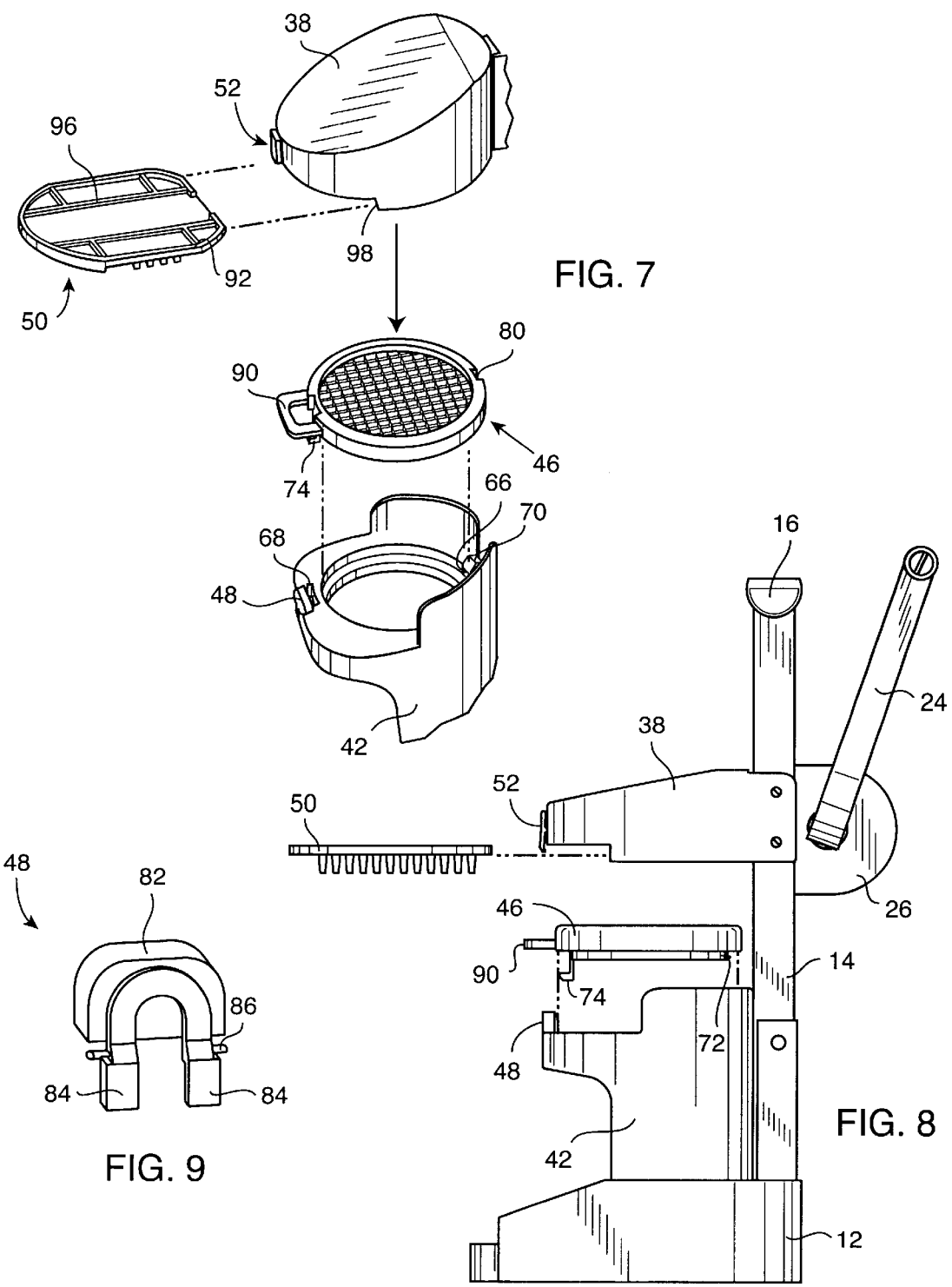

SYSTEM FOR SECURELY AND REMOVABLY ATTACHING A FOOD PROCESSING ADAPTER TO A FOOD PROCESSING AND JUICING UNIT

RELATED APPLICATION

This application is a continuation-in-part of U.S. application Ser. No. 09/833,872, filed Apr. 12, 2001, pending which claims priority from U.S. Provisional Application Ser. No. 60/196,380 filed Apr. 12, 2000, and U.S. Provisional Application Ser. Nos. 60/274,184 and 60/274,183 both filed Mar. 9, 2001.

BACKGROUND OF THE INVENTION

The present invention generally relates to kitchen and culinary devices. More particularly, the present invention relates to a manually operated multi-function food processing, preparation and juicing unit, and a system for securely and removably attaching a food processor adapter to such a unit.

There exist many hand operated devices for juicing, cutting fruit into segments, and cutting vegetables into a desired size and shape. However, these devices often require a substantial amount of exertion and force to perform their intended function. The use of these devices can be quite taxing to the ordinary users of such devices. Another disadvantage of such devices is the need for a device for each operation. For example, there must be stored a juicer, a wedger or segmenter, and perhaps several cutting implements for vegetables.

There also exist various automated devices. Although these devices also include interchangeable components, allowing the user to perform more than one function with the device, they are rather large in size as well as expensive, and don't always perform all the intended tasks adequately, or do not perform certain functions at all.

Another problem encountered with food processing, preparation and juicing units has been that the removable food processing adapters are not securely locked into position. This can cause one of the food processing adapters to rotate out of the mating position with the other adapter. Also, the adapters might move during the processing of the food, creating non-uniform preparation of the food, such as non-uniform vegetable slices or sticks. Another problem associated with the non-secure attachment of such adapters is that as the upper adapter is brought away from the lower adapter, it is not uncommon for the lower adapter to be removed from its position partially or even entirely. This requires the user to manually grasp the adapters and dislodge them from any remaining food that has been unprocessed and subsequently reposition the adapter.

Accordingly, there is a need for a multi-functional unit which is capable of food processing, preparation and juicing. Such a unit should be relatively easy to operate so as not to require undue exertion on behalf of the user. Such a unit should also be capable of being re-configurable so as to perform a variety of tasks. What is also needed is a system for securely and removably attaching food processor adapters to such units. The present invention fulfills these needs and provides other related advantages.

SUMMARY OF THE INVENTION

The present invention resides in a system for securely and removably attaching a food processing adapter to a food processing and juicing unit. Such food processing units typically have a holder at a base thereof, and a pressure assembly capable of being brought towards and away from the holder, oftentimes manually using a handle associated with the pressure assembly.

The system includes an upper processing adapter removably attached to the pressure assembly. In a particularly preferred embodiment, the pressure assembly includes a semi-peripheral groove on the lower edge thereof into which an upper peripheral edge of the upper processing adapter is configured to be inserted. Typically, a manually actuated lock is associated with the pressure assembly and configured to releaseably hold the upper processing adapter in place. The lock includes a vertically slidable stop having a platform extending into the pressure assembly, and a spring interposed between the platform and the pressure assembly to bias the stop in a closed position.

A lower processing adapter having a surface configuration which cooperates with the upper processing adapter to form a predetermined food processing function is removably attached to the holder. A first slot is formed in an upper portion of the holder, and a second slot is formed in the upper portion of the holder spaced from the first slot so that the first and second slots are generally opposite one another. The first slot extends into the top portion of the holder at a generally horizontal orientation. The second slot extends into the top portion of the holder at a generally vertical orientation. The lower processing adapter has a first tab that extends generally horizontally from a lower edge thereof and configured to be inserted into the first slot. A second tab includes a leg extending generally vertical from the lower edge of the lower processing adapter, and a foot extending transverse to the leg at an end thereof so as to be inserted into the second slot.

A locking mechanism is associated with the second slot and configured to releaseably lock the second tab in place within the second slot. The locking mechanism in a particularly preferred embodiment is pivotally connected to the holder and includes a button having a prong extending downwardly therefrom and biased over the foot of the second tab when the lower processing adapter is attached to the holder. The prong prevents the second tab from being lifted from the holder until the button is actuated causing the prong to be removed from its bias position and permitting the second tab, and lower processing adapter, to be lifted from the holder. The lower processing adapter may include a handle for facilitating the insertion and removal thereof from the holder. A tab may also extend from the holder and be configured to be inserted into a notch formed in the lower processing adapter to further secure the lower processing adapter to the holder, and also to serve as a guide in the proper placement of the lower processing adapter.

The system of the present invention securely attaches the food processing adapters to the food processing and juicing unit, preventing the adapters from rotating or becoming dislodged from their proper placement during operation of the unit. The system is designed such that an untrained user of the food processing and juicing unit can safely and quickly remove and exchange food processing adapters as meets the need of the user.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is a partially exploded perspective view of the multi-functional unit of FIG. 1;

FIG. 3 is a perspective view of an exemplary upper processing adapter used in accordance with the present invention;

FIG. 7 is a partially fragmented and exploded perspective view of a system for securely and removably attaching the food processing adapters to the multi-functional unit;

FIG. 8 is a partially exploded side elevational view of the multi-functional unit, illustrating the insertion points of the upper and lower food processing adapters;

FIG. 9 is an enlarged perspective view of a locking mechanism used in accordance with the present invention to lock the lower processing adapter in place;

DETAILED DESCRIPTION OF THE PREFERRED EMBODIMENTS

Figure 1:
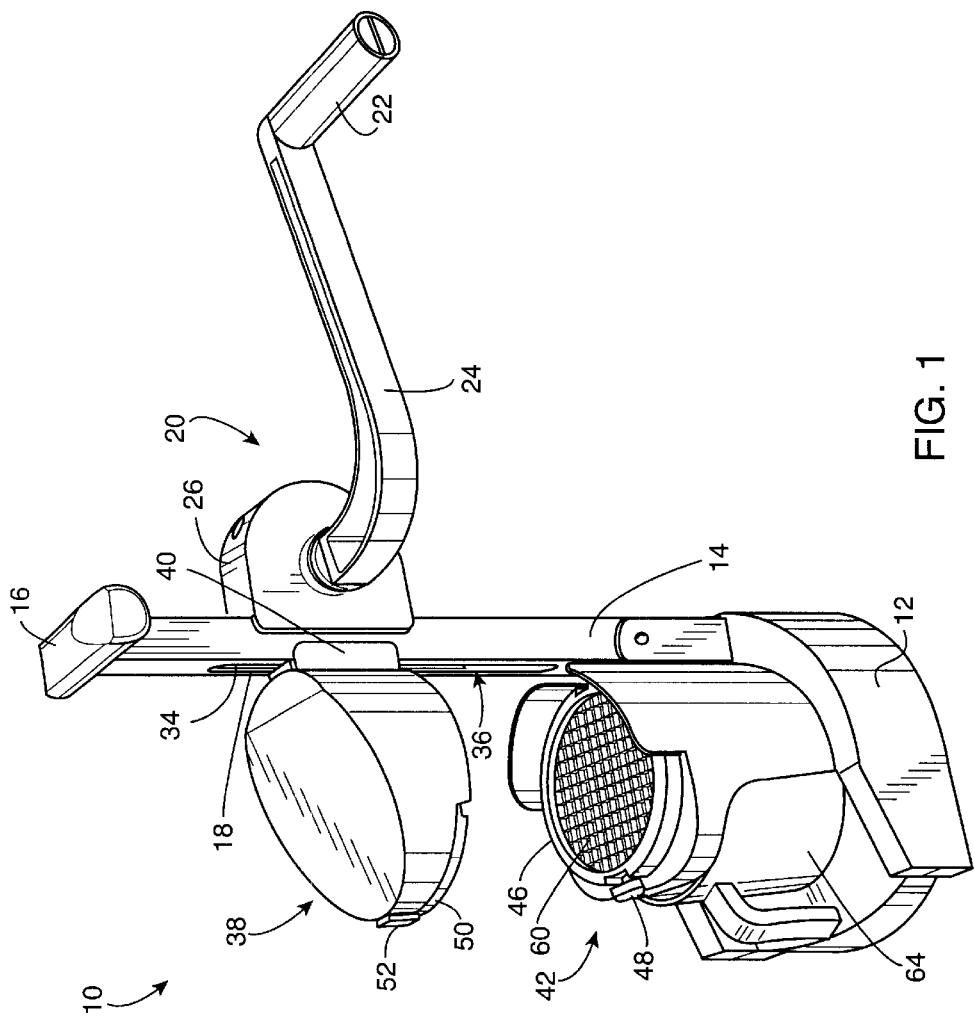
FIG. 1 is a perspective view of an exemplary multi-functional food processing, preparation and juicing unit used in accordance with the present invention.

As shown in the drawings for purposes of illustration, the present invention resides in a system for securely and removably attaching food processing adapters to a food processing and juicing unit. The system is particularly adapted for use in the multi-functional unit 10 illustrated in the accompanying drawings and described with particularity below. However, the system could be incorporated into other similar food processing units.

With reference to FIG. 1, the exemplary multi-functional unit 10 includes a base 12 which serves to stabilize the unit 10. A post 14 is fixed to the base 12 and extends vertically upward therefrom. The post 14 is hollow and typically comprised of metal or other durable material. Preferably, the post 14 includes a hand grip 16 attached to an end thereof opposite the base 12 which can be grasped by a user of the multi-functional unit 10 during operation of the unit 10 and also serve to stabilize the multi-functional unit 10 when in use. At least one slot 18 is formed through a surface of the post 14, which purpose will be further discussed herein.

A rotatable crank assembly 20 is connected to the post 14. The crank assembly 20 includes a handle 22 connected to a first end of a crank arm 24. With reference to FIGS. 1 and 7, the second end of the crank arm 24 is insertable into a housing 26 which surrounds a gear 28 of the crank arm assembly 20. A wing nut 30 or the like holds the crank arm 24 in place so that it is operably engaged with the gear 28. The crank arm 24 can be disengaged from the gear 28 and removed from the multi-functional unit 10 by loosening wing nut 30 and sliding the second end of the crank arm 24 from its engagement with the gear 28. Such disengagement may be desirable when the multi-functional unit 10 is to be stored in a compact space.

Figure 5:
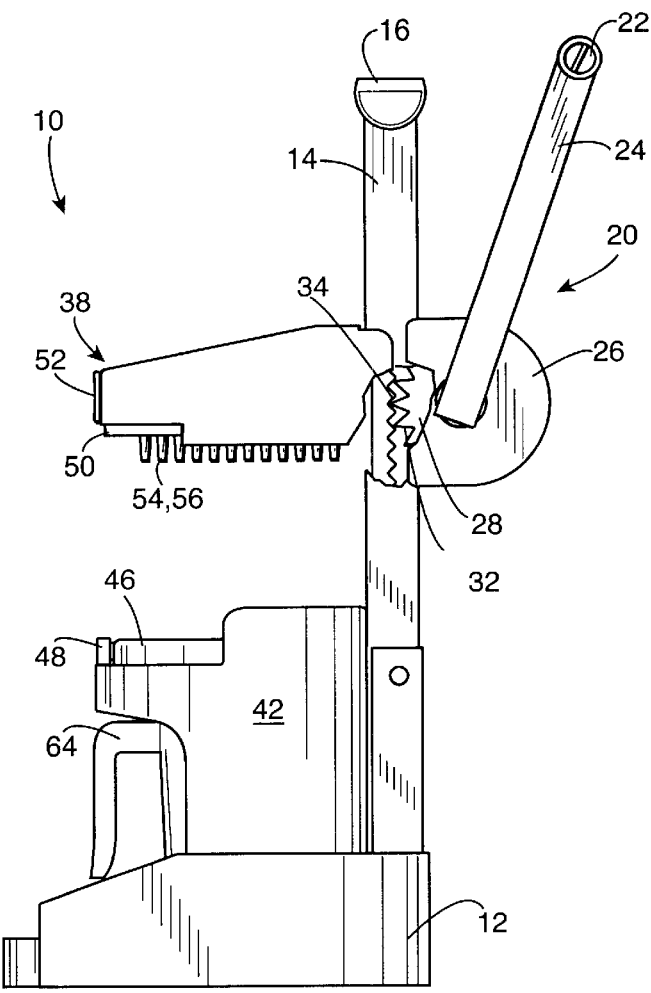
FIG. 5 is a partially fragmented side elevational view, illustrating a gear of a rotatable crank assembly engaged with teeth of a rack of the pressure assembly positioned at an elevated position.
Figure 6:
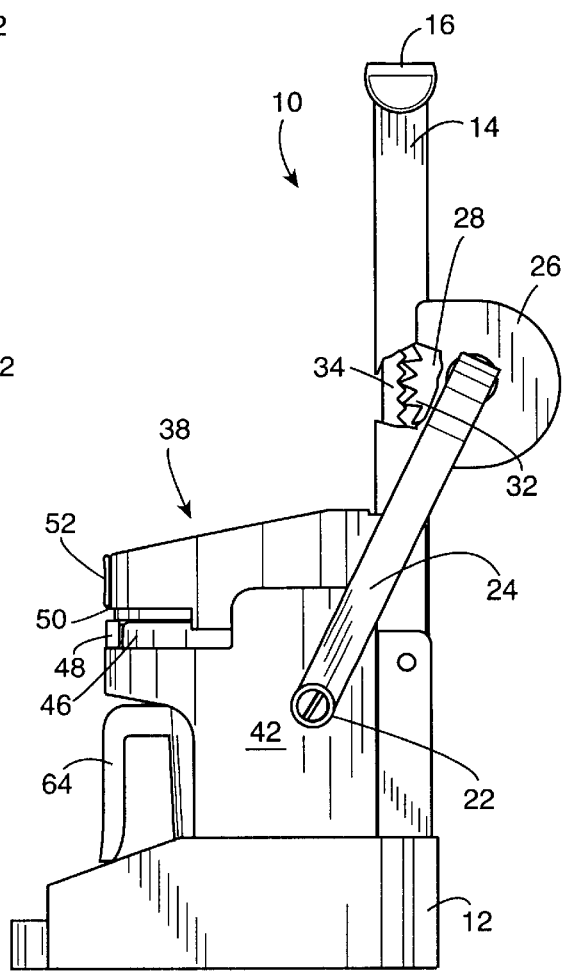
FIG. 6 is a partially fragmented perspective view similar to FIG. 5, wherein a handle of the rotatable crank assembly has been rotated to move the pressure assembly into contact with the holder.

With reference to FIGS. 5 and 6, the gear 28 has cogs 32 which engage teeth 34 of a rack 36 residing within the hollow post 14. The rack 36 is connected to a pressure assembly 38 through the one or more slots 18. Although the drawings illustrate a single slot 18 formed in a front face of the post 14, it should be understood that there may be other configurations, such as opposing slots formed in the sides of the post 14 which could serve the same purpose. As the gear 28 of the crank arm assembly 20 is rotated by rotating handle 22 and crank arm 24, the rack 36 is moved upwardly or downwardly within the post 14, causing the pressure assembly 38 to similarly move along the length of the post 14. Crank assembly 20 is preferably fixed in place on the post 14. Typically, the pressure assembly 38 is connected to the rack 38 directly or by means of a bracket 40 or ears attached to or extending from the pressure assembly 38 at one end thereof for connection to the rack 36, particularly when the slots 18 are formed in opposing sides of the post 14. Thus, the pressure assembly 38 is capable of moving along the post 14 throughout the length of the slot 18.

Referring to FIGS. 1 and 2, a holder 42 is immovably attached or otherwise fixed to an upper surface of the base 12. The holder 42 defines an aperture 44 through which processed food, juice, etc. can pass through. The holder 42 is configured such that a lower processing adapter 46 can be placed over aperture 44. Typically, the lower processing adapter 46 is releaseably attached to a top of the holder over the aperture 44 and held in place with a lock 48, as will be described more fully herein.

Similarly, the pressure assembly 38 is configured such that an upper processing adapter 50 is attached to a bottom surface thereof. Typically, the upper processing adapter 50 is inserted into an adapter-accepting groove and cavity formed at the bottom surface of the pressure assembly 38. The upper processing adapter 50 is held in place with lock 52, as will be described more fully herein. In this manner, the upper processing adapter 50 is held securely in place until lock 52 is manually actuated to release the upper processing adapter 50.

With reference to FIGS. 2 and 3, the upper processing adapter 50 has a predetermined surface configuration 54 which is intended to facilitate the food processing or juicing function desired. As illustrated in FIG. 3, the upper processing adapter 50 includes multiple square projections 56 rising from the upper processing adapter 50. The lower processing adapter 46 includes a surface configuration 58 which cooperates and mates with the upper processing adapter surface configuration 54 to bring about the desired function. As illustrated in FIG. 2, the lower processing adapter surface processing configuration 58 comprises a grid of wires or cutting blades 60 forming apertures which substantially mate with the square projections 56 of the upper processing adapter 50. Thus, when a potato, vegetable or the like is placed on the lower processing adapter 46, and the pressure assembly 38 brought towards the holder 42 by rotating handle 22, the potato, vegetable, or the like is cut into french fry or shoe string-like pieces. The holder 42 is configured such that pressure assembly 38 can be brought towards the holder 42 until upper processing adapter 50 actually contacts or even passes through the lower processing adapter 46.

It will be appreciated by the reader that the surface processing configurations 54 and 58 can be varied such that the vegetable is cut into different shapes, a piece of fruit is cored and cut into wedge-shaped segments, or citrus or the like is pressed to remove the juice therefrom. The multi-functional unit 10 can accomplish all of these various food processing and juicing functions by replacing the upper and lower processing adapters 50 and 46 to initiate the desired function.

Figure 4:
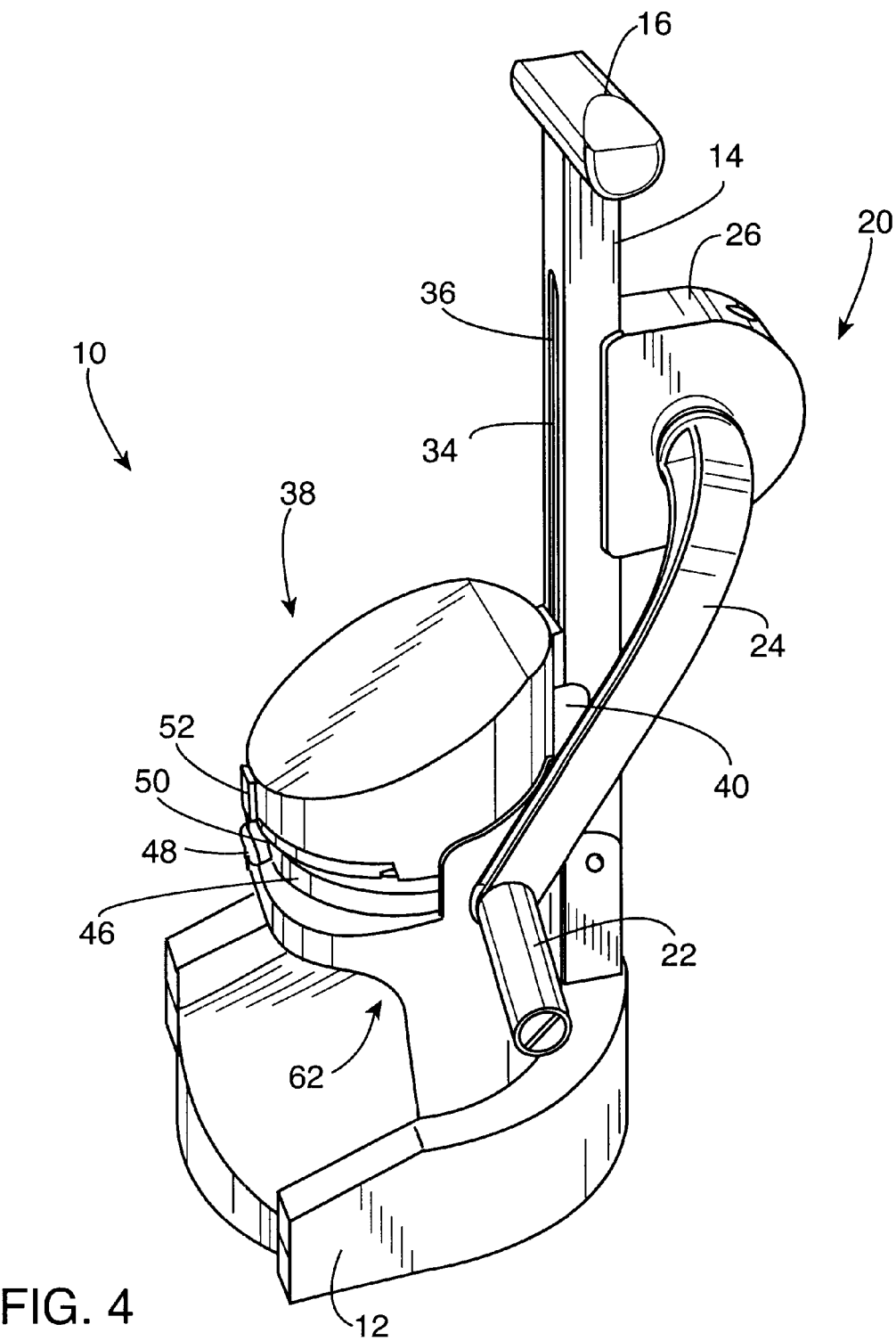
FIG. 4 is another perspective view of the multi-functional unit, illustrating a pressure assembly thereof moved into engagement with a holder thereof.

With the intended upper and lower processing adapters 46 and 50 in place on the holder 42 and pressure assembly 38, respectively, the intended food processing function is performed by rotating handle 22, causing gear 28 to rotate and move rack 36, and thus the upper processing adapter 50 positioned in the pressure assembly 38, downwardly towards the lower processing adapter 46 positioned on holder 42, as illustrated in FIG. 4. The desired cutting, juicing, etc. is thus performed.

With reference to FIGS. 1 and 2, the holder 42 is configured such with relation to the base 12 so as to form a cavity 62 therebetween. This cavity 62 is intended for capture and transfer of the processed food or juice which has been forced through aperture 44. Preferably, the cavity 62 is dimensioned such that a container 64 can be placed thereunder to capture the processed food or juice. The container 64 can be placed within the cavity 62, or even be locked therein so as to prevent the container 64 from inadvertently moving out of position during operation of the multi-functional unit 10.

As described above, food processing adapters 46 and 50 used in such manual food processing and multi-function units 10 have had the tendency to disadvantageously move during the operation of the unit 10. Accordingly, the multi-functional unit 10 includes a system for securely and removably attaching the food processing adapters 46 and 50 to their respective holder 42 and pressure assembly 38.

With reference to FIGS. 7–11, an upper portion of the holder 42 includes a first slot 66 extending generally horizontally into the holder 42. A second slot 68 is positioned generally opposite the first slot 66 and is directed into the holder 42 in a vertical orientation. The holder 42 also includes a tab 70 extending upwardly therefrom, typically adjacent to the first slot 66, whose purpose will be more fully described herein.

The lower processing adapter 46 includes a first tab 72 extending generally horizontally from a lower edge thereof, and configured to be inserted into the first slot 66. A second tab 74 extends downwardly from a lower edge of the lower processing adapter 46 in a generally vertical orientation. The second tab 74 is configured such so as to be introduced into the second slot 68. The second tab 74 includes a leg portion 76 extending vertically, and a foot 78 extending from the leg 76 at an orientation generally transverse to the leg 76.

A notch 80 is formed in the outer periphery of the lower processing adapter 46 which is sized and configured such so as to receive the tab 70 extending upwardly from the holder 42. The tab 70 and notch 80 aid the user in aligning the lower processing adapter 46 to its proper orientation, and also serves to more securely hold the lower processing adapter 46 in place.

Figure 10:
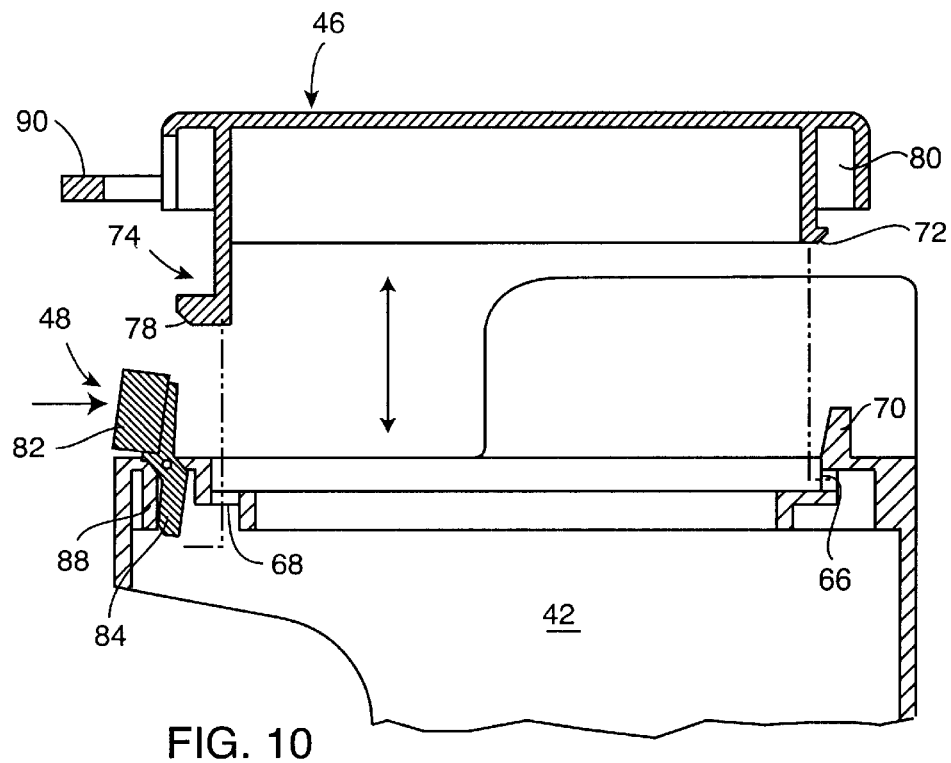
FIG. 10 is a fragmented sectional view of an upper portion of the holder, the locking mechanism, and the lower processing adapter, illustrating the lower processing adapter being inserted into place.
Figure 11:
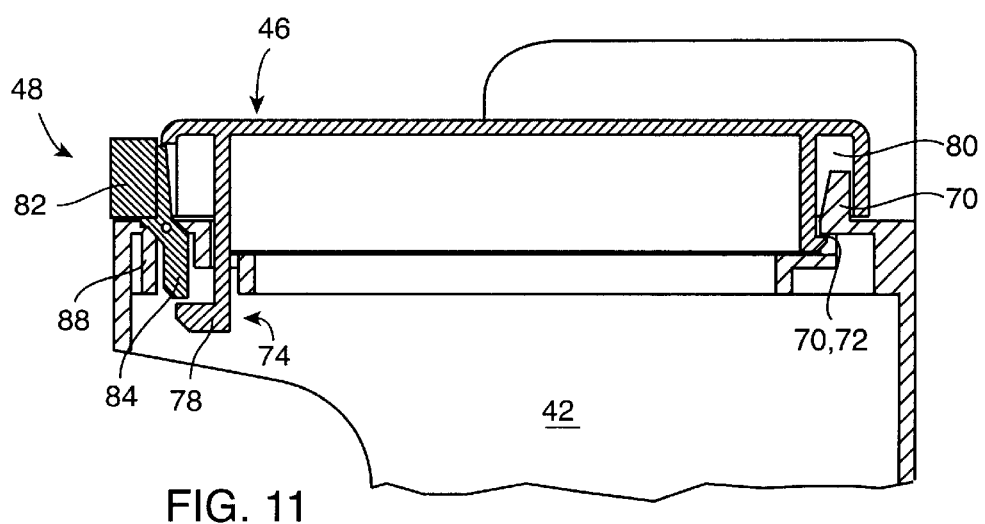
FIG. 11 is a fragmented sectional view similar to FIG. 10, illustrating the lower processing adapter locked into place on the holder.

With reference now to FIGS. 9–11, the locking mechanism 48 includes a finger-actuated button 82 having at least one prong 84 extending downwardly therefrom and into the holder 42 adjacent to the second slot 68. The button and prongs 82 and 84 are pivotally positioned within the holder 42 via side bars 86. A resiliently flexible internal lip 88 of the holder 42 biases the prongs 84 into the vertical, and closed, position. Upon pressing the button 82, the prongs 84 are pivoted into contact with the lip 88 which deforms slightly. Upon release of the pressure, the lip 88 pushes the prongs 84 back into their closed position.

To secure the lower processing adapter 46 to the holder 42, the user aligns the tab 70 and notch 80, inserts first tab 72 into the first slot 66, and pushes the second tab 74 into vertical slot 68. The lower processing adapter 46 may include a handle 90 extending from a front edge thereof to assist in this process. The handle 90 also serves as a safety feature as oftentimes the working surface 60 of the lower processing unit 46 is comprised of sharp edges. The handle 90 allows the user to obtain the lower processing unit 46 from storage, properly insert it into the holder 42, and remove it without fear of coming into contact with the working surface 60. However, such handle 90 is not critical to the invention. As can be seen in FIG. 11, once the second tab 74 is inserted into slot 68, the leg 78 of the tab 74 is positioned under the prongs 84 of the locking mechanism 48. Thus, the lower processing adapter 46 cannot be removed from the holder 42 without actuating the locking mechanism 48, as described above, in order to move the prongs 84 away from the foot 78 so that the second tab 74 can be removed from the slot 68. Due to the two points of attachment, as well as both the horizontal and vertical orientations of the tabs 72 and 74 and slots 66 and 68, the lower processing adapter 46 cannot be lifted from the holder 42 unintentionally, nor will it rotate out of position.

Figure 12:
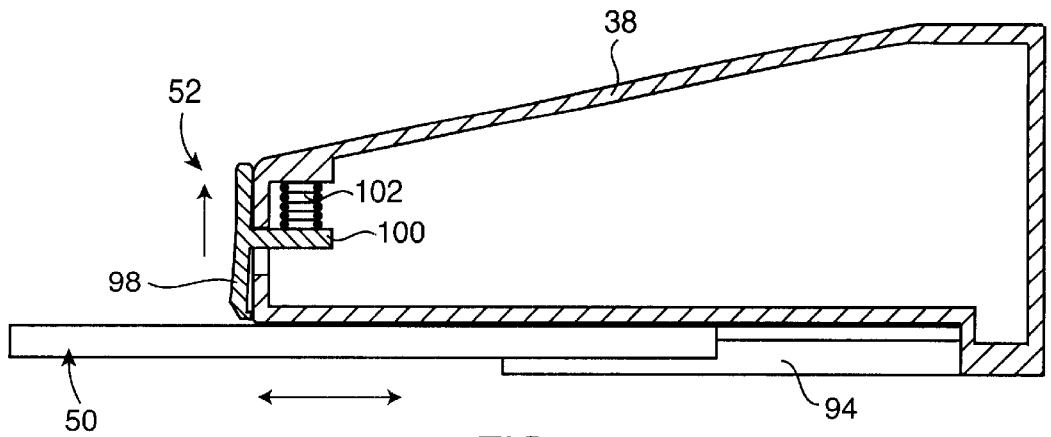
FIG. 12 is a side-sectional view of the pressure assembly of the multi-functional unit, illustrating a locking mechanism associated therewith, and the insertion of an upper processing adapter.
Figure 13:
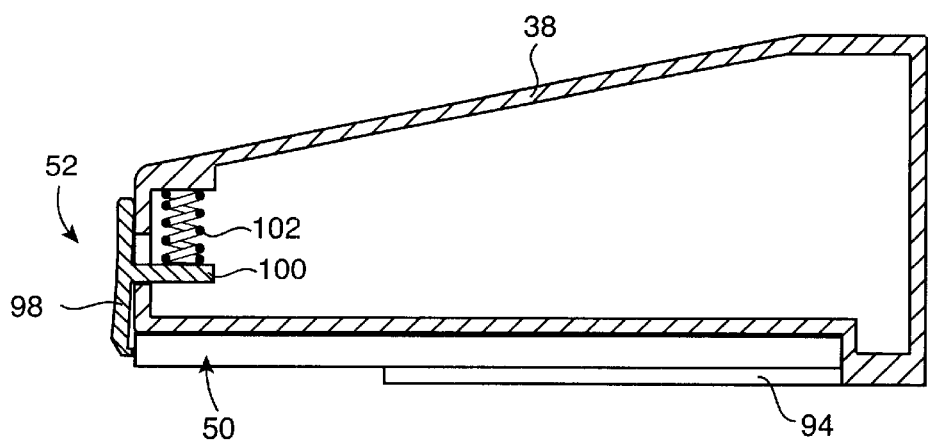
FIG. 13 is a side-sectional view similar to FIG. 12, illustrating the upper processing adapter locked into place on the pressure assembly.

With reference now to FIGS. 7 and 12–13, an outer peripheral edge 92 of the upper processing adapter 50 is configured to be received within a semi-peripheral groove 94 formed at the bottom surface of the pressure assembly 38. As illustrated in FIG. 7, an upper surface of the upper processing adapter 50 may include tracks 96 which mate with corresponding tracks or grooves on the lower surface of the pressure assembly 38 to further assist the user in guiding the upper processing adapter 50 in place, as well as holding the upper processing adapter 50 in its proper orientation and position.

A locking mechanism 52 further holds the upper processing adapter 50 in place within the pressure assembly 38. The locking assembly 52 includes a manually actuated vertically slidable stop 98 having a platform 100 extending into the pressure assembly 38, and a spring 102 interposed between the platform 100 and the pressure assembly 38 to bias the stop 98 in a closed position. Thus, to insert the upper processing adapter 50 in place, the stop 98 is pressed upwardly, compressing the spring 102, as the upper processing adapter peripheral edges 92 are slid into the assemblies grooves 94. Upon releasing the stop 98, the spring 102 biases the platform 100 downwardly, moving the stop 98 in front of a leading edge of the upper processing adapter 50 to hold it in place. With such an arrangement, the upper processing adapter 50 cannot rotate, nor move from its position within the grooves 94 within the pressure assembly 38 until it is intentionally removed therefrom.

Figure 14:
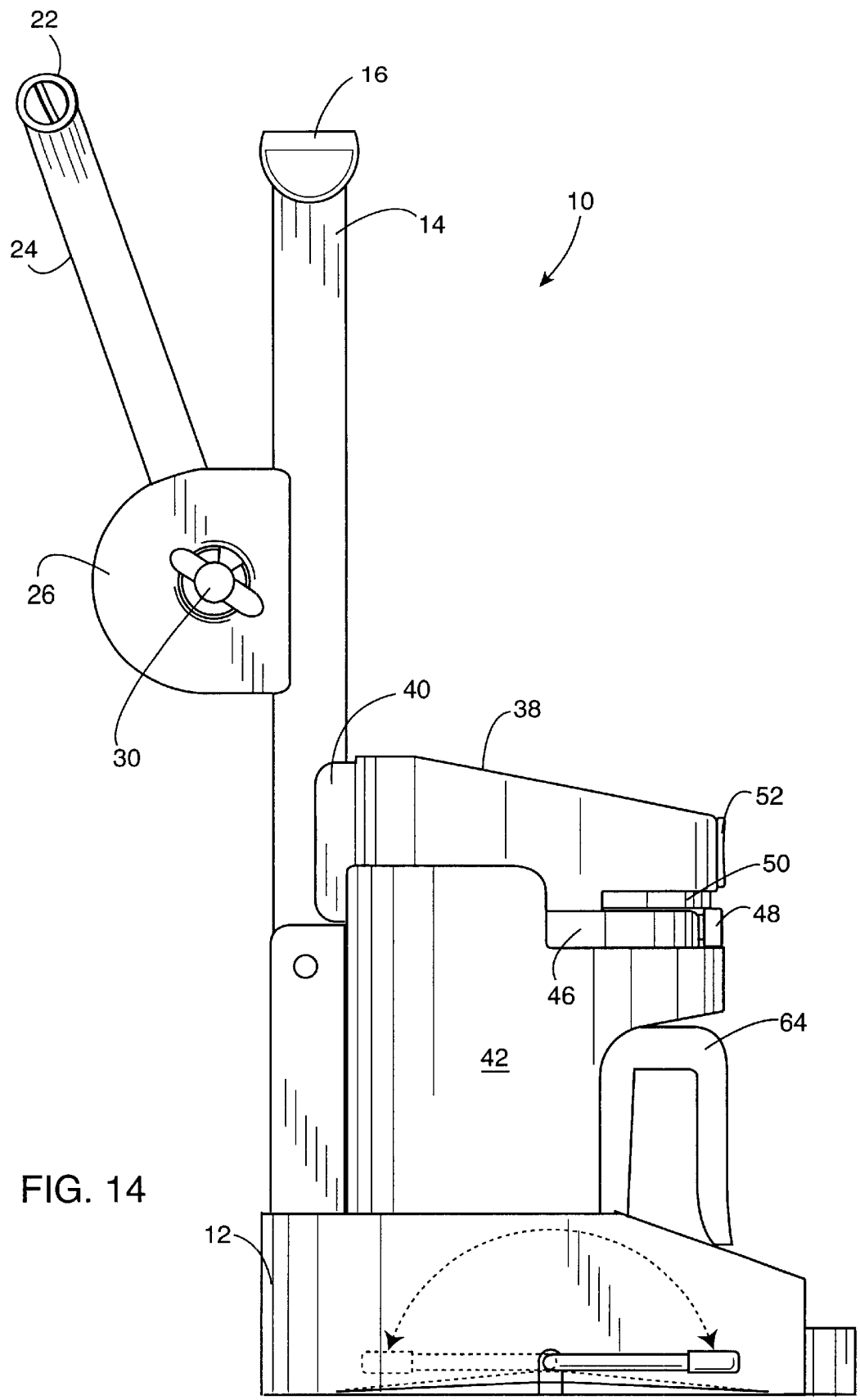
FIG. 14 is a side elevational view of the multi-functional unit, illustrating actuation of a lever to releaseably lock the multi-functional unit onto a flat surface.

With reference now to FIG. 14, the multi-functional unit 10 may include a locking mechanism 104 for selectively locking the unit 10 onto a flat surface. As illustrated in FIG. 14, this locking mechanism 104 preferably comprises a vacuum lock mechanism 104 associated with the base 12. The vacuum lock mechanism 104 includes a lever 106 attached to a generally circular membrane 108 attached at its periphery to a bottom surface of the base 12. The lever 106 extends out an aperture 110 of the base 12 and is pivotable between a released state wherein the membrane 108 is in a relaxed and generally flat configuration, and a locked state wherein the lever 106 upon pivoting moves the membrane 108 upward into a generally convex configuration, creating a vacuum seal between the base 12 and flat surface underlying the base 12 so that the base 12 is suctioned securely onto the flat surface. Such a locking mechanism 104 is advantageous in that the multi-functional unit 10 can be placed upon a table, countertop, etc. having a flat and smooth surface and locked in place thereon by pivoting lever 106.

With the multi-functional unit 10 immobile, food is more easily processed, juice extracted, etc. without fear that the multi-functional unit 10 will topple or otherwise become unstable during the manual rotation of the handle 22. This also frees the hands of the user so that one hand can hold onto the fruit or vegetable positioned between the pressure assembly 38 and holder 42 until the handle 22 is rotated such that the pressure assembly 38 applies sufficient pressure to the vegetable or fruit that it no longer needs to be held in place. The user can then grasp hand grip 16 while continuing to rotate handle 22 to complete the desired food processing function. Such a vacuum lock mechanism 104 is preferred over other locking mechanisms, although such can be incorporated into the invention, as it does not require the proper positioning on a ledge, adjustment of parts, etc. that such locking mechanisms require. However, the unit can be designed such that the locking mechanism 104 can be removed, so that processed food can fall directly through the holder 42 and onto the counter or cutting board or other working surface.

Although several embodiments have been described in detail for purposes of illustration, various modifications may be made to each without departing from the scope and spirit of the invention. Accordingly, the invention is not to be limited, except as by the appended claims.

What is claimed is:

1. A system for securely and removably attaching a food processing adapter to a food processing and juicing unit having a holder at a base thereof, and a pressure assembly capable of being brought towards and away from the holder, the attachment system comprising:

an upper processing adapter removably attached to the pressure assembly;

a first slot formed in an upper portion of the holder;

a second slot formed in the upper portion of the holder and spaced from the first slot;

a lower processing adapter having a surface configuration which cooperates with the upper processing adapter to perform a predetermined food processing function, the lower processing adapter having a first tab extending therefrom and configured to be inserted into the first slot, and a second tab extending from the lower processing adapter and configured to be inserted into the second slot, whereby the lower processing adapter is securely and removably attached to the holder of the food processing unit.

2. The attachment system of claim 1, wherein the first slot extends into the top portion of the holder at a generally horizontal orientation, and the second slot extends into the top portion of the holder at a generally vertical orientation.

3. The attachment system of claim 1, wherein the first and second slots are generally opposite one another in the top portion of the holder.

4. The attachment system of claim 2, wherein the first tab extends generally horizontally from a lower edge of the lower processing adapter, and the second tab includes a leg extending generally vertical from the lower edge of the lower processing adapter and a foot extending transverse to the leg at an end thereof opposite the lower edge of the lower processing adapter.

5. The attachment system of claim 1, including a locking mechanism associated with the second slot and configured to releasably lock the second tab in place within the second slot.

6. The attachment system of claim 5, wherein the locking mechanism is pivotally connected to the holder and includes a button having a prong extending downwardly therefrom and biased over the foot of the second tab when the lower processing adapter is attached to the holder so as to prevent the second tab from being lifted from the holder in its biased position until the button is actuated causing the prong to be removed from its biased position and permitting the second tab, and lower processing adapter, to be lifted from the holder.

7. The attachment system of claim 1, wherein an upper peripheral edge of the upper processing adapter is configured to be inserted into a semi-peripheral groove on a lower edge of the pressure assembly.

8. The attachment system of claim 7, including a manually actuated lock associated with the pressure assembly and configured to releasably hold the upper processing adapter in place.

9. The attachment system of claim 8, wherein the lock includes a vertically slidable stop having a platform extending into the pressure assembly and a spring interposed between the platform and the pressure assembly to bias the stop in a closed position.

10. The attachment system of claim 1, wherein the lower processing adapter includes a handle extending therefrom.

11. The attachment system of claim 1, including a tab extending from the holder and configured to be inserted into a notch formed in the lower processing adapter.

12. A system for securely and removably attaching a food processing adapter to a food processing and juicing unit having a holder at a base thereof, and a pressure assembly capable of being brought towards and away from the holder, the attachment system comprising:

an upper processing adapter removably attached to the pressure assembly;

a first slot extending into an upper portion of the holder in a generally horizontal orientation;

a second slot extending into the upper portion of the holder in a generally vertical orientation, and spaced from the first slot so as to be generally opposite the first slot;

a lower processing adapter having a surface configuration which cooperates with the upper processing adapter to perform a predetermined food processing function, the lower processing adapter having a first tab extending generally horizontally from a lower edge thereof and configured to be inserted into the first slot, and a second tab configured to be inserted into the second slot, the second tab having a leg extending generally vertically from the lower edge of the lower processing adapter and a foot extending transverse to the leg at an end opposite the lower edge, whereby the lower processing adapter is securely and removably attached to the holder of the food processing unit.

13. The attachment system of claim 12, including a locking mechanism associated with the second slot and configured to releaseably lock the second tab in place within the second slot.

14. The attachment system of claim 13, wherein the locking mechanism is pivotally connected to the holder and includes a button having a prong extending downwardly therefrom and biased over the foot of the second tab when the lower processing adapter is attached to the holder so as to prevent the second tab from being lifted from the holder in its biased position until the button is actuated causing the prong to be removed from its biased position and permitting the second tab, and lower processing adapter, to be lifted from the holder.

15. The attachment system of claim 12, wherein an upper peripheral edge of the upper processing adapter is configured to be inserted into a semi-peripheral groove on a lower edge of the pressure assembly.

16. The attachment system of claim 15, including a manually actuated lock associated with the pressure assembly and configured to releaseably hold the upper processing adapter in place.

17. The attachment system of claim 16, wherein the lock includes a vertically slidable stop having a platform extending into the pressure assembly and a spring interposed between the platform and the pressure assembly to bias the stop in a closed position.

18. The attachment system of claim 12, including a handle extending from the lower processing adapter.

19. The attachment system of claim 12, including a tab extending from the holder and configured to be inserted into a notch formed in the lower processing adapter.

20. A system for securely and removably attaching a food processing adapter to a food processing and juicing unit having a holder at a base thereof, and a pressure assembly capable of being brought towards and away from the holder, the attachment system comprising:

an upper processing adapter having a peripheral edge configured to be inserted into a semi-peripheral groove on a lower edge of the pressure assembly;

a first slot extending into an upper portion of the holder in a generally horizontal orientation;

a second slot extending into the upper portion of the holder in a generally vertical orientation, and spaced from the first slot so as to be generally opposite the first slot;

a lower processing adapter having a surface configuration which cooperates with the upper processing adapter to perform a predetermined food processing function, the lower processing adapter having a first tab extending generally horizontally from a lower edge thereof and configured to be inserted into the first slot, and a second tab configured to be inserted into the second slot, the second tab having a leg extending generally vertically from the lower edge of the lower processing adapter and a foot extending transverse to the leg at an end opposite the lower edge, whereby the lower processing adapter is securely and removably attached to the holder of the food processing unit; and a locking mechanism associated with the second slot and configured to releaseably lock the second tab in place within the second slot.

21. The attachment system of claim 20, wherein the second tab locking mechanism is pivotally connected to the holder and includes a button having a prong extending downwardly therefrom and biased over the foot of the second tab when the lower processing adapter is attached to the holder so as to prevent the second tab from being lifted from the holder in its biased position until the button is actuated causing the prong to be removed from its biased position and permitting the second tab, and lower processing adapter, to be lifted from the holder.

22. The attachment system of claim 20, including a manually actuated lock associated with the pressure assembly and configured to releaseably hold the upper processing adapter in place.

23. The attachment system of claim 20, wherein the upper adapter lock includes a vertically slidable stop having a platform extending into the pressure assembly and a spring interposed between the platform and the pressure assembly to bias the stop in a closed position.

24. The attachment system of claim 20, including a handle extending from the lower processing adapter.

25. The attachment system of claim 20, including a tab extending from the holder and configured to be inserted into a notch formed in the lower processing adapter.

\* \* \* \* \*